US010329364B2

(12) United States Patent
Pannell et al.

(10) Patent No.: US 10,329,364 B2
(45) Date of Patent: *Jun. 25, 2019

(54) CATALYST COMPOSITION, METHODS OF PREPARATION AND USE IN A POLYMERIZATION PROCESS

(71) Applicant: Univation Technologies, LLC, Houston, TX (US)

(72) Inventors: Richard B. Pannell, Kingwood, TX (US); David M. Glowczwski, Baytown, TX (US); Chi-I Kuo, Humble, TX (US); Timothy R. Lynn, Middlesex, NJ (US); Fathi David Hussein, Hilton Head Island, SC (US); Phuong A. Cao, Middlesex, NJ (US); Wesley R. Mariott, Freeport, TX (US); Michael D. Awe, Middlesex, NJ (US)

(73) Assignee: Univation Technologies, LLC, Houston, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/300,373

(22) PCT Filed: Feb. 5, 2015

(86) PCT No.: PCT/US2015/014547
§ 371 (c)(1),
(2) Date: Sep. 29, 2016

(87) PCT Pub. No.: WO2015/152991
PCT Pub. Date: Oct. 8, 2015

(65) Prior Publication Data
US 2017/0183434 A1 Jun. 29, 2017

Related U.S. Application Data

(60) Provisional application No. 61/985,143, filed on Apr. 28, 2014, provisional application No. 61/974,032, filed on Apr. 2, 2014.

(51) Int. Cl.
| | |
|---|---|
| C08F 4/64 | (2006.01) |
| C08F 4/72 | (2006.01) |
| C08F 210/16 | (2006.01) |
| C08F 10/02 | (2006.01) |
| B01J 31/02 | (2006.01) |
| B01J 31/16 | (2006.01) |
| B01J 31/18 | (2006.01) |
| B01J 31/22 | (2006.01) |
| C08F 4/659 | (2006.01) |
| C08F 4/6592 | (2006.01) |

(52) U.S. Cl.
CPC ............ *C08F 210/16* (2013.01); *C08F 10/02* (2013.01); *B01J 31/0202* (2013.01); *B01J 31/0237* (2013.01); *B01J 31/0271* (2013.01); *B01J 31/1608* (2013.01); *B01J 31/1805* (2013.01); *B01J 31/2295* (2013.01); *B01J 2531/48* (2013.01); *B01J 2531/49* (2013.01); *C08F 4/65912* (2013.01); *C08F 4/65925* (2013.01); *C08F 4/65927* (2013.01); *C08F 2410/02* (2013.01)

(58) Field of Classification Search
CPC .. C08F 2/002; C08F 2/005; C08F 2/34; C08F 2410/02
See application file for complete search history.

(56) References Cited

U.S. PATENT DOCUMENTS

| | | | |
|---|---|---|---|
| 6,245,868 B1 * | 6/2001 | Agapiou | B01J 8/0005 524/855 |
| 7,067,610 B2 | 6/2006 | Vaporciyan | |
| 8,496,882 B2 | 7/2013 | Matthews et al. | |
| 8,497,330 B2 * | 7/2013 | Hussein | C08F 10/00 526/127 |
| 9,676,885 B2 * | 6/2017 | Pannell | C08F 210/16 |
| 9,873,958 B2 | 1/2018 | Pepper et al. | |
| 2009/0286942 A1 | 11/2009 | Van Pelt et al. | |

FOREIGN PATENT DOCUMENTS

| | | |
|---|---|---|
| JP | 2005/089582 | 4/2005 |
| WO | 96/11960 | 4/1996 |
| WO | 00/02930 | 1/2000 |
| WO | 00/66637 | 11/2000 |
| WO | 2011/017092 | 2/2011 |
| WO | 2012/074709 | 6/2012 |
| WO | 2012/151663 | 11/2012 |

OTHER PUBLICATIONS

International Preliminary Report on Patentability for related PCT Application PCT/US2015/014547, dated Oct. 13, 2016 (8 pgs).
International Search Report & Written Opinion for related PCT Application PCT/US2015/014547, dated May 21, 2015 (11 pgs).

* cited by examiner

*Primary Examiner* — Rip A Lee
(74) *Attorney, Agent, or Firm* — Brooks, Cameron & Huebsch, PLLC

(57) ABSTRACT

Polymerization catalyst compositions are provided as are methods of their preparation. The compositions comprise fatty amines and find advantageous use in olefin polymerization processes. The catalyst composition comprises at least one supported polymerization catalyst wherein the catalyst composition is modified with at least one fatty amine wherein the fatty amine is substantially free of particulate inorganic material.

18 Claims, No Drawings

CATALYST COMPOSITION, METHODS OF PREPARATION AND USE IN A POLYMERIZATION PROCESS

CROSS REFERENCE TO RELATED APPLICATIONS

This application is a National Stage Application under 35 U.S.C. § 371 of International Application Number PCT/US2015/014547, filed Feb. 5, 2015 and published as WO 2015/152991 on Oct. 8, 2015, which claims the benefit to U.S. Provisional Application 61/985,143, filed Apr. 28, 2014 and U.S. Provisional Application 61/974,032, filed Apr. 2, 2014, the entire contents of which are incorporated herein by reference in its entirety.

FIELD

The present disclosure relates to a catalyst composition and methods for preparing the catalyst composition and to its use in a process for polymerizing olefins. In particular, the disclosure is directed to a method for preparing a catalyst composition of a metallocene type catalyst system and/or a conventional-type transition metal catalyst system and a fatty amine additive.

BACKGROUND

A major focus of the polyolefin industry in recent years has been on the development of new catalysts that deliver new and improved products. In this regard, metallocene catalysts, for example, are now widely used to produce polyolefin polymers, such as polyethylene polymers. While there are many advantages to using metallocene catalysts in olefin polymerization, there remain significant challenges. For example, metallocene catalysts, in particular supported metallocene catalysts, may be more prone to causing reactor fouling which may cause disruption and premature shutdown of the reactor. This is particularly the case in particle forming processes, such as gas and slurry phase processes. Adding other reagents to the polymerization process, such as antifouling agents, antistatic agents or continuity additives/aids or continuity compositions, have been used to address such fouling issues.

In order to address reactor fouling problems caused by high activity metallocene catalysts, additives containing fatty amines have been added to the polymerization process, either separately or as part of a supported catalyst composition. However, the fatty amines have always contained a particulate inorganic material.

U.S. Pat. Appln. Pubn. No. US20010020072 discloses the use of a particular ethoxylated stearyl amine commercially available as AS-990 as an antistatic agent in olefin polymerization. AS-990 contains ethoxylated stearyl amine and particulate silica. The particulate silica is present at a level of about 10% by weight based on the weight of the ethoxylated stearyl amine and silica. The silica is added to improve the handling qualities of the ethoxylated stearyl amine which is a waxy solid at ambient temperature.

However, such fatty amine/silica compositions are time consuming to prepare and often show inconsistent behavior. Mixing solid or waxy components can result in the formation of agglomerates which may make the material difficult to dry to the low moisture levels desirable for use in olefin polymerization.

Therefore, despite the various polymerization catalysts known, challenges remain. Thus, it would be desirable to provide catalyst compositions useful in olefin polymerization that are advantageous to prepare and handle and are also capable of operating in a polymerization process continuously with enhanced reactor operability.

SUMMARY

In a first aspect there is provided a catalyst composition, comprising at least one supported polymerization catalyst wherein the supported polymerization catalyst is modified with at least one fatty amine and wherein the fatty amine is substantially free of particulate inorganic material. The term "substantially free" when used in this context, means that the fatty amine comprises less than 2% by weight, or less than 1% by weight, or less than 0.5% by weight or 0% by weight of particulate inorganic material.

The fatty amine may be substantially free of a particulate inorganic oxide. For example the fatty amine may be substantially free of particulate silica or particulate alumina, that is comprising less than 2% by weight, or less than 1% by weight, or less than 0.5% by weight or 0% by weight of particulate inorganic material or particulate silica or particulate alumina.

The at least one fatty amine may be represented by the formula:

wherein
$R_1$ is a hydrocarbyl radical having from 9 to 40 carbon atoms;
$R_2$ is a hydrocarbylene diradical having from 1 to 8 carbon atoms; and
x has a value of 1 or 2 and x+y=3.

$R_1$ may be a hydrocarbyl radical having from 14 to 26 carbon atoms. $R_2$ may be methylene, ethylene, n-propylene, n-butylene or iso-propylene.

The fatty amine may be ethoxylated stearyl amine.

The fatty amine may be present from about 0.05 to about 20% by weight, or from about 0.1 to about 10% by weight, or from about 0.1 to about 5% by weight or from about 0.2 to about 2% by weight based on the total weight of the catalyst composition.

The catalyst composition may be in the form of a substantially dry powder or may be in the form of a slurry in a suitable liquid vehicle. The liquid vehicle may be an aliphatic or aromatic hydrocarbon or mixtures thereof. The liquid vehicle may also be a mineral oil.

The supported polymerization catalyst may comprise a support, an activator, and one or more catalyst compounds comprising a titanium, a zirconium, or a hafnium atom. The catalyst compound may comprise:
(pentamethylcyclopentadienyl)(propylcyclopentadienyl)MX$_2$,
(tetramethylcyclopentadienyl)(propylcyclopentadienyl)MX$_2$,
(tetramethylcyclopentadienyl)(butylcyclopentadienyl)MX$_2$,
Me$_2$Si(indenyl)$_2$MX$_2$,
Me$_2$Si(tetrahydroindenyl)$_2$MX$_2$,
(n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
HN(CH$_2$CH$_2$N(2,4,6-Me$_3$phenyl))$_2$MX$_2$,
HN(CH$_2$CH$_2$N(2,3,4,5,6-Me$_5$phenyl))$_2$MX$_2$, (propyl cyclopentadienyl)(tetramethylcyclopentadienyl)MX$_2$,
(butyl cyclopentadienyl)$_2$MX$_2$,
(propyl cyclopentadienyl)$_2$MX$_2$, and mixtures thereof,
wherein M is Zr or Hf, and X is selected from F, Cl, Br, I, Me, benzyl, CH$_2$SiMe$_3$, and C$_1$ to C$_5$ alkyls or alkenyls.

The supported polymerization catalyst may comprise two or more catalyst compounds comprising a titanium, a zirconium, or a hafnium atom. The two or more catalyst compounds may comprise one or more metallocene compounds and one or more Group 15 containing metal compounds. The metallocene compound may comprise:

(pentamethylcyclopentadienyl)(propylcyclopentadienyl)MX$_2$,
(tetramethylcyclopentadienyl)(propylcyclopentadienyl)MX$_2$,
(tetramethylcyclopentadienyl)(butylcyclopentadienyl)MX$_2$,
Me$_2$Si(indenyl)$_2$MX$_2$,
Me$_2$Si(tetrahydroindenyl)$_2$MX$_2$,
(n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
(propyl cyclopentadienyl)(tetramethylcyclopentadienyl)MX$_2$,
(butyl cyclopentadienyl)$_2$MX$_2$,
(propyl cyclopentadienyl)$_2$MX$_2$, and mixtures thereof,
wherein M is Zr or Hf, and X is selected from F, Cl, Br, I, Me, benzyl, CH$_2$SiMe$_3$, and C$_1$ to C$_5$ alkyls or alkenyls; and the Group 15 metal containing compound may comprise:

HN(CH$_2$CH$_2$N(2,4,6-Me$_3$phenyl))$_2$MX$_2$ or
HN(CH$_2$CH$_2$N(2,3,4,5,6-Me$_5$phenyl))$_2$MX$_2$,
wherein M is Zr or Hf, and X is selected from F, Cl, Br, I, Me, benzyl, CH$_2$SiMe$_3$, and C$_1$ to C$_5$ alkyls or alkenyls.

The fatty amines used herein possess advantages over those utilized in the prior art. For example, the time consuming process of treating the fatty amine with silica may be dispensed with. The fatty amines may be dried, optionally under vacuum, and, further, optionally with the aid of nitrogen purging and/or sparging, minimizing the formation of agglomerates. The fatty amines may be dried to low moisture levels in relatively short periods of time with excellent batch to batch consistency.

The catalyst compositions disclosed herein may possess advantageous properties. Supported catalysts which have been treated with fatty amines as disclosed herein surprisingly offer catalyst compositions which perform well in continuous olefin polymerization processes in terms of catalyst activity and/or process continuity.

Also disclosed herein are methods for making the catalyst compositions and polymerization processes utilizing the catalyst compositions.

Accordingly, there is also provided herein a method for producing a catalyst composition, comprising the step of contacting at least one supported catalyst with at least one fatty amine, as hereinbefore described, wherein the fatty amine is substantially free of particulate inorganic material.

The method may be performed in the presence of one or more liquid vehicles. The liquid vehicle may be an aliphatic or aromatic hydrocarbon. Preferably the liquid vehicle is an aromatic hydrocarbon.

The method may comprise the step of: contacting at least one supported catalyst and at least one fatty amine, as herein disclosed, in at least one liquid vehicle, so as to form a slurry of the catalyst composition in said liquid vehicle.

The method may also comprise the steps of:
a) combining at least one supported catalyst with a liquid vehicle to form a slurry; and
b) adding at least one fatty amine to the slurry so as to form a slurry of the catalyst composition in said liquid vehicle.

The method may also comprise the steps of:
a) combining at least one fatty amine with a liquid vehicle; and
b) combining at least one supported catalyst with the mixture formed in a) so as to form a slurry of the catalyst composition in said liquid vehicle.

The method may further comprise the step of drying the slurry formed in the herein disclosed methods to provide a substantially dry and/or free flowing powder.

In any of the herein disclosed methods the fatty amine may be dissolved in the liquid vehicle. The liquid vehicle may be an aromatic solvent such as toluene.

The fatty amine may be pre-dried at temperatures above ambient, optionally with the aid of vacuum, and further optionally with the aid of nitrogen purging and/or sparging.

There is also disclosed herein a process for polymerizing olefins, the process comprising: contacting olefins with one or more catalyst compositions as hereinbefore disclosed in a reactor under polymerization conditions to produce an olefin polymer or copolymer

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

Disclosed herein are catalyst compositions for the polymerization of olefins which are advantageous to prepare and use. The catalyst compositions are characterized in that they are modified by or contacted with or treated with at least one fatty amine which is substantially free of particulate inorganic material. The catalyst compositions may be capable of operating in a polymerization process continuously with enhanced reactor operability. Also disclosed herein are methods of making the catalyst compositions and polymerization processes utilizing the catalyst compositions for the production of olefin polymers.

Catalysts

Any catalyst or combination of catalysts utilized to polymerize olefins are suitable for use in the polymerizing processes of the present disclosure. The following is a discussion of various catalysts set forth for the purpose of explanation and not limitation.

General Definitions

As used herein, a "catalyst composition" includes one or more catalyst components utilized to polymerize olefins and may also include at least one activator or alternatively, at least one cocatalyst. A catalyst composition may also include other components, for example, supports, and is not limited to the catalyst component and/or activator or cocatalyst alone or in combination. The catalyst composition may include any suitable number of catalyst components in any combination as described herein, as well as any activator or cocatalyst in any combination as described herein. A "catalyst composition" may also contain one or more additional components known in the art to reduce or eliminate reactor fouling such as continuity additives.

As used herein, a "catalyst compound" may include any compound that, when activated, is capable of catalyzing the polymerization or oligomerization of olefins, wherein the catalyst compound comprises at least one Group 3 to 12 atom, and optionally at least one leaving group bound thereto.

As used herein, the term "continuity additive" is a component or additive or aid, such as solids or liquids, that are useful in gas phase or slurry phase polymerization processes to reduce or eliminate fouling of the reactor, where "fouling" may be manifested by any number of phenomena including sheeting of the reactor walls, plugging of inlet and outlet lines, formation of large agglomerates, or other forms of reactor upsets known in the art.

Conventional Catalysts

Conventional catalysts are those traditional Ziegler-Natta catalysts and Phillips-type chromium catalyst well known in the art. Examples of conventional-type transition metal catalysts are disclosed in U.S. Pat. Nos. 4,115,639, 4,077,904 4,482,687, 4,564,605, 4,721,763, 4,879,359 and 4,960,741. The conventional-type transition metal catalyst compounds that may be used in the present invention include, but are not limited to transition metal compounds from Groups III to VIII of the Periodic Table of the Elements.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R may include alkoxy, phenoxy, bromide, chloride and fluoride. Conventional-type transition metal catalysts where M is titanium may include, but are not limited to, $TiCl_4$, $TiBr_4$, $Ti(OC_2H_5)_3Cl$, $Ti(OC_2H_5)Cl_3$, $Ti(OC_4H_9)_3$ Cl, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566. The $MgTiCl_6$ (ethyl acetate)$_4$ derivative is one such example. British Patent Application 2,105,355 describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. Examples of conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention may include $CrO_3$, chromocene, silyl chromate, chromyl chloride ($CrO_2Cl_2$), chromium-2-ethylhexanoate, chromium acetylacetonate ($Cr(AcAc)_3$), and the like. Non-limiting examples are disclosed in, for example, U.S. Pat. Nos. 3,242,099 and 3,231,550.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436. The conventional-type transition metal catalysts of the invention may also have the general formula $M'_1M''X_{2t}Y_uE$, where M' is Mg, Mn and/or Ca; t is a number from 0.5 to 2; M" is a transition metal Ti, V and/or Zr; X is a halogen, preferably Cl, Br or I; Y may be the same or different and is halogen, alone or in combination with oxygen, —$NR_2$, —OR, —SR, —COOR, or —OSOOR, where R is a hydrocarbyl radical, in particular an alkyl, aryl, cycloalkyl or arylalkyl radical, acetylacetonate anion in an amount that satisfies the valence state of M; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5.2CH_3COOC_2H_5$, $Mg_3Ti_2Cl_{12}7CH_3COOC_2H_5$, $MgTiCl_5.6C_2H_5OH$, $MgTiCl_5.100CH_3OH$, $MgTiCl_5$ tetrahydrofuran, $MgTi_2Cl_{12}7C_6H_5CN$, $MgTi_2$ $Cl_{12}6C_6H_5COOC_2H_5$, $MgTiCl_62CH_3COOC_2H_5$, $MgTiCl_66C_5H_5N$, $MgTiCl_5(OCH_3)2CH_3COOC_2H_5$, $MgTiCl_5N(C_6H_5)_23CH_3COOC_2H_5$, $MgTiBr_2Cl_42(C_2H_5)O$, $MnTiCl_54C_2H_5OH$, $Mg_3V_2Cl_{12}.7CH_3COOC_2H_5$, $MgZrCl_64$tetrahydrofuran. Other catalysts may include cationic catalysts such as $AlCl_3$, and other cobalt and iron catalysts well known in the art.

The conventional-type transition metal catalyst compounds disclosed herein may be activated with one or more of the conventional-type cocatalysts described below.

Conventional Cocatalysts and other Components

Conventional-type cocatalyst compounds for the above conventional-type transition metal catalyst compounds may be represented by the formula $M^3M^4_vX^2_cR^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Examples of conventional-type organometallic cocatalyst compounds of Group IA, IIA and IIIA useful with the conventional-type catalyst compounds described above include, but are not limited to, methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as trihexyl-aluminum, triethylaluminum, trimethylaluminum, and tri-isobutylaluminum. Other conventional-type cocatalyst compounds may include mono-organohalides and hydrides of Group IIA metals, and mono- or di-organohalides and hydrides of Group IHA metals. Non-limiting examples of such conventional-type cocatalyst compounds may include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415.

Metallocene Catalysts

Metallocene catalysts may include "half sandwich," (i.e., at least one ligand) and "full sandwich," (i.e., at least two ligands) compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocene(s)" or "metallocene catalyst component(s)."

The one or more metallocene catalyst components may be represented by the formula (I):

$$Cp^A Cp^B MX_n \qquad (I)$$

The metal atom "M" of the metallocene catalyst compound, as described throughout the specification and claims, may be selected from the group consisting of Groups 3 through 12 atoms and lanthanide Group atoms; selected from the group consisting of Groups 4, 5 and 6 atoms; Ti, Zr, Hf atoms, or Zr. The groups bound the metal atom "M" are such that the compounds described below in the formulas and structures are neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

M is as described above; each X is chemically bonded to M; each Cp group is chemically bonded to M; and n is 0 or an integer from 1 to 4, or either 1 or 2.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. $Cp^A$ and $Cp^B$ may be independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof.

More particular non-limiting examples of alkyl substituents R associated with formula (i) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. Two adjacent R groups, when present, may be joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (I) may be independently selected from the group consisting of: any leaving group, for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. X may also be $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof. X may also be selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls. X may also be selected from hydride, chloride, fluoride, methyl, phenyl, phenoxy, benzoxy, tosyl, fluoromethyls and fluorophenyls. X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls. X may be selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls).

The metallocene catalyst compound and/or component may include those of formula (I) where $Cp^A$ and $Cp^B$ are bridged to each other by at least one bridging group, (A), such that the structure is represented by formula (II):

$$Cp^A(A)Cp^BMX_n \qquad (II)$$

These bridged compounds represented by formula (II) are known as "bridged metallocenes". $Cp^A$, $Cp^B$, M, X and n are as defined above for formula (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (I) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $—Si(R')_2Si(R'_2)—$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. The bridged metallocene catalyst component of formula (II) may have two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

The bridging group (A) may also be cyclic, comprising, for example 4 to 10, 5 to 7 ring members. The ring members may be selected from the elements mentioned above, from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents may be selected from the group consisting of hydrocarbyl (e.g., alkyl such as methyl) and halogen (e.g., F, Cl). The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) may be different from each other or the same as each other.

The metallocene catalyst components may include mono-ligand metallocene compounds (e.g., mono cyclopentadienyl catalyst components) such as described in WO 93/08221 for example which is incorporated herein by reference.

The at least one metallocene catalyst component may be an unbridged "half sandwich" metallocene represented by the formula (IV):

$$Cp^AMQ_qX_n \qquad (IV)$$

wherein $Cp^A$ is defined as for the Cp groups in (I) and is a ligand that is bonded to M; each Q is independently bonded to M; Q is also bound to $Cp^A$; X is a leaving group as described above in (I); n ranges from 0 to 3, or is 1 or 2; q ranges from 0 to 3, or is 1 or 2. $Cp^A$ may be selected from the group consisting of cyclopentadienyl, indenyl, tetrahydroindenyl, fluorenyl, substituted version thereof, and combinations thereof.

In formula (IV), Q is selected from the group consisting of $ROO^-$, $RO—$, $R(O)—$, $—NR—$, $—CR_2—$, $—S—$, $—NR_2$, $—CR_3$, $—SR$, $—SiR_3$, $—PR_2$, $—H$, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. R may be selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, and $C_6$ to $C_{12}$ aryloxys. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (II), such as described in, for example, U.S. Pat No. 6,069,213:

$$Cp^AM(Q_2GZ)X_n \text{ or } T(Cp^AM(Q_2GZ)X_n)_m \quad (V)$$

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of —O—, —NR—, —CR$_2$— and —S—; G is either carbon or silicon; and Z is selected from the group consisting of R, —OR, —NR$_2$, —CR$_3$, —SR, —SiR$_3$, —PR$_2$, and hydride, providing that when Q is —NR—, then Z is selected from the group consisting of —OR, —NR$_2$, —SR, —SiR$_3$, —PR$_2$; and provided that neutral valency for Q is satisfied by Z; and wherein each R is independently selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. R may be selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n may be 1 or 2;

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^AM(Q_2GZ)X_n$" groups, and is chemically bonded to the $Cp^A$ groups;

m may be an integer from 1 to 7; or m may be an integer from 2 to 6.

The metallocene catalyst component may be described more particularly in structures (VIa), (VIb), (VIc), (VId), (VIe), and (VIf):

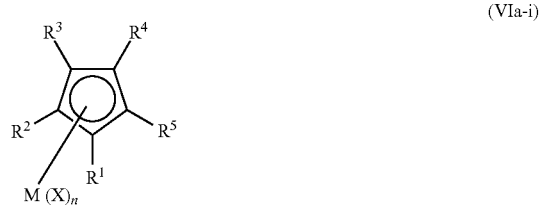
(VIa-i)

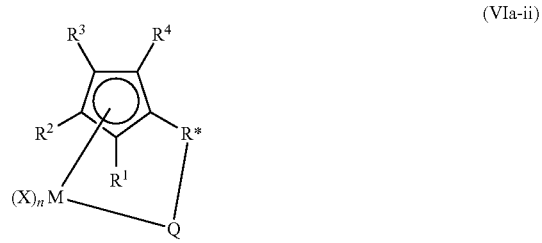
(VIa-ii)

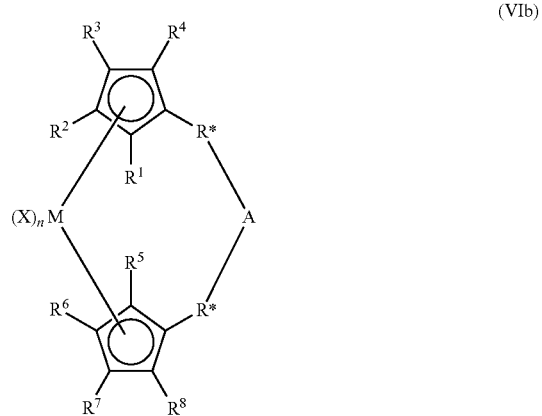
(VIb)

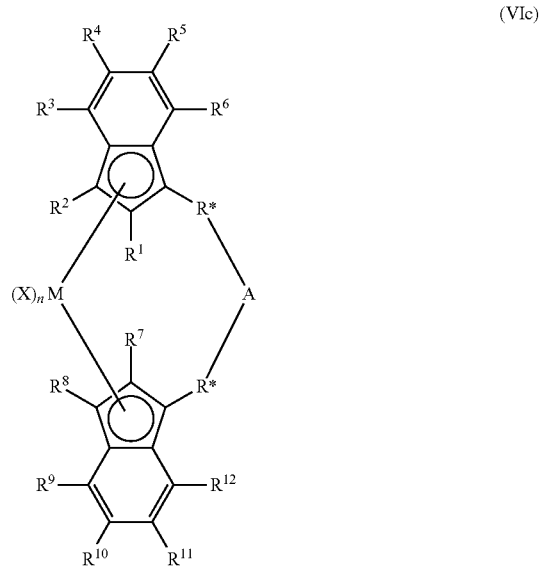
(VIc)

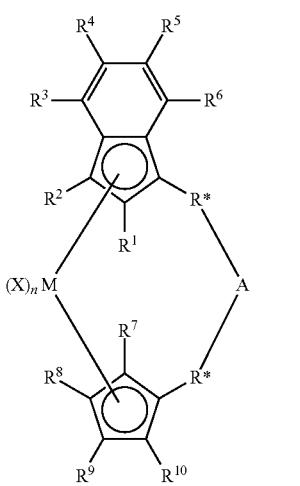

wherein in structures (VIa) to (VIf), M is selected from the group consisting of Group 3 to Group 12 atoms, selected from the group consisting of Group 3 to Group 10 atoms, selected from the group consisting of Group 3 to Group 6 atoms, selected from the group consisting of Group 4 atoms, selected from the group consisting of Zr and Hf or is Zr; wherein Q in (VIa) to (VIf) is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, alkylenes, alkyls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q may comprise from 1 to 20 carbon atoms; and wherein the aromatic groups may comprise from 5 to 20 carbon atoms; wherein R* may be selected from divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additionally, R* may be from the group of divalent hydrocarbylenes and heteroatom-containing hydrocarbylenes, selected from the group consisting of alkylenes, substituted alkylenes and heteroatom-containing hydrocarbylenes, selected from the group consisting of $C_1$ to $C_{12}$ alkylenes, $C_1$ to $C_{12}$ substituted alkylenes, and $C_1$ to $C_{12}$ heteroatom-containing hydrocarbylenes, or selected from the group consisting of $C_1$ to $C_4$ alkylenes. Both R* groups may be identical in structures (VIf).

A is as described above for (A) in structure (II), and more particularly, selected from the group consisting of a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups; or selected from the group consisting of $C_5$ to $C_8$ cyclic hydrocarbons, —CH$_2$CH$_2$—, =CR$_2$ and =SiR$_2$; wherein R is selected from the group consisting of alkyls, cycloalkyls, aryls, alkoxys, fluoroalkyls and heteroatom-containing hydrocarbons; R is selected from the group consisting of $C_1$ to $C_6$ alkyls, substituted phenyls, phenyl, and $C_1$ to $C_6$ alkoxys; or R is selected from the group consisting of methoxy, methyl, phenoxy, and phenyl; or A may be absent, in which case each R* is defined as for R$^1$-R$^{13}$; each X is as described above in (I); n is an integer from 0 to 4, or from 1 to 3, or from 1 or 2; and R$^1$ through R$^{13}$ are independently: selected from the group consisting of hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos. through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls; or hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups; wherein adjacent R groups may form a ring, either saturated, partially saturated, or completely saturated.

The structure of the metallocene catalyst component represented by (VIa) may take on many forms such as disclosed in, for example, U.S. Pat. Nos. 5,026,798, 5,703, 187, and 5,747,406, including a dimer or oligomeric structure, such as disclosed in, for example, U.S. Pat. Nos. 5,026,798 and 6,069,213.

For the metallocene represented in (VId), $R^1$ and $R^2$ form a conjugated 6-membered carbon ring system that may or may not be substituted.

It is contemplated that the metallocene catalysts components described above include their structural or optical or enantiomeric isomers (racemic mixture), or may be a pure enantiomer.

As used herein, a single, bridged, asymmetrically substituted metallocene catalyst component having a racemic and/or meso isomer does not, itself, constitute at least two different bridged, metallocene catalyst components.

The "metallocene catalyst compound", also referred to herein as the "metallocene catalyst component" may comprise any combination of the above described features.

Metallocene compounds and catalysts are known in the art and any one or more may be utilized herein. Suitable metallocenes include but are not limited to all of the metallocenes disclosed and referenced in the U.S. Patents cited above, as well as those disclosed and referenced in U.S. Pat. Nos. 7,179,876, 7,169,864, 7,157,531, 7,129,302, 6,995, 109, 6,958,306, 6,884,748, 6,689,847, U.S. Patent Application publication number 2007/0055028, and published PCT Application Nos. WO 97/22635, WO 00/699/22, WO 01/30860, WO 01/30861, WO 02/46246, WO 02/50088, WO 04/026921, and WO 06/019494, all fully incorporated herein by reference. Additional catalysts suitable for use herein include those referenced in U.S. Pat. Nos. 6,309,997, 6,265,338, U.S. Patent Application publication number 2006/019925, and the following articles: Chem Rev 2000, 100, 1253, Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Group 15-Containing Catalysts

The catalyst composition may include one or metallocene catalysts as described above and/or other conventional polyolefin catalysts, as well as Group 15 atom containing catalysts described below.

"Group 15 atom containing" catalysts or "Group 15-containing" catalysts may include complexes of Group 3 to 12 metal atoms, wherein the metal atom is 2 to 8 coordinate, the coordinating moiety or moieties including at least two Group 15 atoms, and up to four Group 15 atoms. The Group 15-containing catalyst component may be a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460, EP A1 0 893 454, U.S. Pat. Nos. 5,318,935, 5,889,128, 6,333,389 B2 and 6,271,325 B1.

The Group 15-containing catalyst components may include Group 4 imino-phenol complexes, Group 4 bis (amide) complexes, and Group 4 pyridyl-amide complexes that are active towards olefin polymerization to any extent.

The Group 15-containing catalyst components may include $HN(CH_2CH_2N(2,4,6-Me_3phenyl))_2MX_2$, and $HN(CH_2CH_2N(2,3,4,5,6-Me_5phenyl))_2MX_2$, wherein M is Zr or Hf, and X is selected from F, Cl, Br, I, Me, benzyl, $CH_2SiMe_3$, and $C_1$ to $C_5$ alkyls or alkenyls.

The Group 15-containing catalyst component may include a bisamide compound such as $[(2,3,4,5,6\ Me_5C_6) NCH_2CH_2]_2NHZrBz_2$.

Mixed Catalysts

Additionally one type of catalyst compound described above can be combined with another type of catalyst compound described herein with one or more activators or activation methods described below.

It is further contemplated that other catalysts can be combined with the metallocene catalyst compounds described herein. For example, see U.S. Pat. Nos. 4,937,299, 4,935,474, 5,281,679, 5,359,015, 5,470,811, and 5,719,241.

Additionally, one or more metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210, 559, 4,263,422, 4,672,096, 4,918,038, 5,198,400, 5,237,025, 5,408,015 and 5,420,090.

Activators and Activation Methods for Catalyst Compounds

An activator is defined in a broad sense as any combination of reagents that increases the rate at which a transition metal compound oligomerizes or polymerizes unsaturated monomers, such as olefins. The catalyst compounds may be activated for oligomerization and/or polymerization catalysis in any manner sufficient to allow coordination or cationic oligomerization and/or polymerization.

Additionally, the activator may be a Lewis-base, such as for example, diethyl ether, dimethyl ether, ethanol, or methanol. Other activators that may be used include those described in WO 98/07515 such as tris (2,2',2"-nonafluorobiphenyl) fluoroaluminate.

Combinations of activators may be used. For example, alumoxanes and ionizing activators may be used in combinations, see for example, EP-B1 0 573 120, WO 94/07928 and WO 95/14044 and U.S. Pat. Nos. 5,153,157 and 5,453, 410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate).4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859,653 and 5,869,723 and PCT WO 98/32775.

Alumoxanes may also be utilized as an activator in the catalyst composition. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. A visually clear methylalumoxane may be used. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, disclosed in U.S. Pat. No. 5,041,584).

An ionizing or stoichiometric activator, neutral or ionic, such as tri (n-butyl) ammonium tetrakis (pentafluorophenyl) boron, a trisperfluorophenyl boron metalloid precursor or a trisperfluoronapthyl boron metalloid precursor, polyhalogenated heteroborane anions (see, for example, WO 98/43983), boric acid (see, for example, U.S. Pat. No. 5,942,459) or combinations thereof, may also be used. The neutral or ionic activators may be used alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. The three substituent groups may be independently selected from the group of halogen, mono or multicyclic (including halosubstituted) aryls, alkyls, and alkenyl compounds and mixtures thereof; or alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. The three groups may be halogenated, for example fluorinated, aryl groups. In yet other illustrative examples, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124.

Supports

The above described catalyst compounds may be combined with one or more supports using one of the support methods well known in the art or as described below. For example, in the catalyst compound may be used in a supported form, such as, deposited on, contacted with, or incorporated within, adsorbed or absorbed in, or on the support.

As used herein, the term "support" refers to compounds comprising Group 2, 3, 4, 5, 13 and 14 oxides and chlorides. Suitable supports include, for example, silica, magnesia, titania, zirconia, montmorillonite, phyllosilicate, alumina, silica-alumina, silica-chromium, silica-titania, magnesium chloride, graphite, magnesia, titania, zirconia, montmorillonite, phyllosilicate, and the like.

The support may possess an average particle size in the range of from about 0.1 to about 500 μm, or from about 1 to about 200 μm, or from about 1 to about 50 μm, or from about 5 to about 50 μm.

The support may have an average pore size in the range of from about 10 to about 1000 Å, or about 50 to about 500 Å, or 75 to about 350 Å.

The support may have a surface area in the range of from about 10 to about 700 m$^2$/g, or from about 50 to about 500 m$^2$/g, or from about 100 to about 400 m$^2$/g.

The support may have a pore volume in the range of from about 0.1 to about 4.0 cc/g, or from about 0.5 to about 3.5 cc/g, or from about 0.8 to about 3.0 cc/g.

The support, such as an inorganic oxide, may have a surface area in the range of from about 10 to about 700 m$^2$/g, a pore volume in the range of from about 0.1 to about 4.0 cc/g, and an average particle size in the range of from about 1 to about 500 μm. Alternatively, the support may have a surface area in the range of from about 50 to about 500 m$^2$/g, a pore volume of from about 0.5 to about 3.5 cc/g, and an average particle size of from about 10 to about 200 μm. The surface area of the support may be in the range from about 100 to about 400 m$^2$/g, a pore volume of from about 0.8 to about 3.0 cc/g and an average particle size of from about 5 to about 100 μm.

The catalyst compounds may be supported on the same or separate supports together with an activator, or the activator may be used in an unsupported form, or may be deposited on a support different from the supported catalyst compound.

There are various other methods in the art for supporting a polymerization catalyst compound. For example, the catalyst compound may contain a polymer bound ligand as described in, for example, U.S. Pat. Nos. 5,473,202 and 5,770,755; the catalyst may be spray dried as described in, for example, U.S. Pat. No. 5,648,310; the support used with the catalyst may be functionalized as described in European publication EP-A-0 802 203, or at least one substituent or leaving group is selected as described in U.S. Pat. No. 5,688,880.

Catalyst Compositions

The catalyst compositions disclosed herein may comprise at least one supported polymerization catalyst wherein the supported polymerization catalyst is modified, or treated with, or contacted with, at least one fatty amine and wherein the fatty amine is substantially free of particulate inorganic material. The term "substantially free" when used in this context, means that the fatty amine comprises less than 2% by weight, or less than 1% by weight, or less than 0.5% by weight or 0% by weight of particulate inorganic material.

The at least one fatty amine may be substantially free of a particulate inorganic oxide. For example the fatty amine may be substantially free of particulate silica or particulate alumina. The fatty amine may comprise less than 2% by weight, or less than 1% by weight, or less than 0.5% by weight or 0% by weight of particulate inorganic oxide, or particulate silica or particulate alumina.

The catalyst composition may be in the form of a substantially dry solid or may be in the form of a slurry in a suitable liquid vehicle.

When the catalyst composition is in the form of a substantially dry solid the at least one fatty amine may be present in the catalyst composition in amount up to about 20% by weight based on the total weight of the catalyst composition, or up to about 10% by weight, or up to 5% by weight, or up to 2% by weight or up to 1% by weight.

Fatty amines, as used herein, may be nitrogen derivatives of fatty acids, olefins, or alcohols which may be prepared from natural sources, fats and oils, or petrochemical raw materials. Commercially available fatty amines may consist of either a mixture of carbon chains or a specific chain length from about $C_8$ to about $C_{40}$.

As used herein the at least one fatty amine may be represented by the formula:

$$(R_1)_xN(R_2OH)_y$$

wherein

R$_1$ is a hydrocarbyl radical having from 8 to 40 carbon atoms;

R$_2$ is a hydrocarbylene diradical having from 1 to 8 carbon atoms; and x has a value of 1 or 2 and x+y=3.

R1 may be a hydrocarbyl radical having from 14 to 26 carbon atoms and R$_2$ may be methylene, ethylene, n-propylene, n-butylene or iso-propylene. R1 may be a hydrocarbyl radical having from 14 to 26 carbon atoms and R2 may be ethylene. A non-limiting example of a fatty amine is octadecyl bis(2-hydroxyethyl)amine.

The supported polymerization catalyst may comprise a support, an activator, and one or more catalyst compounds comprising a titanium, a zirconium, or a hafnium atom. The catalyst compound may comprise:

(pentamethylcyclopentadienyl)(propylcyclopentadienyl)MX$_2$, (tetramethylcyclopentadienyl)(propylcyclopentadienyl)MX$_2$, (tetramethylcyclopentadienyl)(butylcyclopentadienyl)MX$_2$, Me$_2$Si(indenyl)$_2$MX$_2$, Me$_2$Si(tetrahydroindenyl)$_2$MX$_2$, (n-propyl cyclopentadienyl)$_2$MX$_2$, (n-butyl cyclopentadienyl)$_2$MX$_2$, (1-methyl, 3-butyl cyclopentadienyl)$_2$MX$_2$, HN(CH$_2$CH$_2$N(2,4,6-Me$_3$phenyl))$_2$MX$_2$, HN(CH$_2$CH$_2$N(2,3,4,5,6-Me$_5$phenyl))$_2$MX$_2$, (propyl cyclopentadienyl)(tetramethylcyclopentadienyl)MX$_2$, (butyl cyclopentadienyl)$_2$MX$_2$, (propyl cyclopentadienyl)$_2$MX$_2$, and mixtures thereof, wherein M is Zr or Hf, and X is selected from F, Cl, Br, I, Me, benzyl, CH$_2$SiMe$_3$, and C$_1$ to C$_5$ alkyls or alkenyls.

The supported polymerization catalyst may comprise two or more catalyst compounds comprising a titanium, a zirconium, or a hafnium atom. The two or more catalyst compounds may comprise one or more metallocene compounds and one or more Group 15 containing metal compounds. The metallocene compound may comprise (pentamethylcyclopentadienyl)(propylcyclopentadienyl)MX$_2$, (tetramethylcyclopentadienyl)(propylcyclopentadienyl)MX$_2$, (tetramethylcyclopentadienyl)(butylcyclopentadienyl)MX$_2$, Me$_2$Si(indenyl)$_2$MX$_2$, Me$_2$Si(tetrahydroindenyl)$_2$MX$_2$, (n-propyl cyclopentadienyl)$_2$MX$_2$, (n-butyl cyclopentadienyl)$_2$MX$_2$, (1-methyl, 3-butyl cyclopentadienyl)$_2$MX$_2$, (propyl cyclopentadienyl)(tetramethylcyclopentadienyl)MX$_2$, (butyl cyclopentadienyl)$_2$MX$_2$, (propyl cyclopentadienyl)$_2$MX$_2$, and mixtures thereof, wherein M is Zr or Hf, and X is selected from F, Cl, Br, I, Me, benzyl, CH$_2$SiMe$_3$, and C$_1$ to C$_5$ alkyls or alkenyls.

The Group 15 metal containing compound may comprise HN(CH$_2$CH$_2$N(2,4,6-Me$_3$phenyl))$_2$MX$_2$ or HN(CH$_2$CH$_2$N(2,3,4,5,6-Me$_5$phenyl))$_2$MX$_2$, wherein M is Zr or Hf, and X is selected from F, Cl, Br, I, Me, benzyl, CH$_2$SiMe$_3$, and C$_1$ to C$_5$ alkyls or alkenyls.

The supported polymerization catalyst may comprise two catalyst compounds selected from:

(Pentamethylcyclopentadienyl)(propylcyclopentadienyl)MX$_2$, (tetramethylcyclopentadienyl)(propylcyclopentadienyl)MX$_2$, (tetramethylcyclopentadienyl)(butylcyclopentadienyl)MX$_2$, Me$_2$Si(indenyl)$_2$MX$_2$, Me$_2$Si(tetrahydroindenyl)$_2$MX$_2$, (n-propyl cyclopentadienyl)$_2$MX$_2$, (n-butyl cyclopentadienyl)$_2$MX$_2$, (1-methyl, 3-butyl cyclopentadienyl)$_2$MX$_2$, (propyl cyclopentadienyl)(tetramethylcyclopentadienyl)MX$_2$, (butyl cyclopentadienyl)$_2$MX$_2$ or (propyl cyclopentadienyl)$_2$MX$_2$, and HN(CH$_2$CH$_2$N(2,4,6-Me$_3$phenyl))$_2$MX$_2$ or HN(CH$_2$CH$_2$N(2,3,4,5,6-Me$_5$phenyl))$_2$MX$_2$, wherein M is Zr or Hf, and X is selected from the group consisting of F, Cl, Br, I, Me, benzyl, CH$_2$SiMe$_3$, and Cl to C5 alkyls or alkenyls.

The catalyst composition may also be in the form of a slurry in at least one liquid vehicle. Non-limiting examples of liquid vehicles include mineral oils, aromatic hydrocarbons or aliphatic hydrocarbons.

The catalyst composition may be in the form of a slurry in the one or more liquid vehicles at from about 1% to about 60% by weight based on the total weight of the slurry. The catalyst composition may be present in the slurry preferably at greater than or equal to about 1%, or 2%, or 4%, or 6%, or 10%, or 15%, or 20%, or 25%, or 30%, or 40%, or 50%, based on the total weight of the slurry.

When a liquid vehicle is present the catalyst composition may comprise at least one fatty amine in an amount greater than or equal to about 0.01%, or 0.05%, or 0.1%, or 0.2%, or 0.5%, or 1%, or 2%, or 3%, or 4%, or 5%, or 6%, or 7%, or 8%, or 10% by weight, based on the total weight of the catalyst composition including liquid vehicle.

Method of Preparing the Catalyst Compositions

Methods for making the catalyst compositions may involve contacting one or more supported catalysts with at least one fatty amine that is substantially free of particulate inorganic material. Contacting may also refer to combining, blending, mixing, modifying or the like. The contacting may take place in the presence or absence of a suitable liquid vehicle.

The supported catalyst may be in substantially dry and/or free flowing form or may be in the form of a slurry in a suitable liquid vehicle.

The at least one fatty amine may be in dry form or dissolved or slurried in a suitable liquid vehicle prior to contacting with the one or more supported catalysts. The slurry may be a suspension or dispersion or emulsion of the fatty amine in the liquid vehicle.

The supported catalyst and the fatty amine may be combined in the presence of a liquid, for example the liquid may be a mineral oil, toluene, hexane, isobutane or a mixture thereof. In one method the fatty amine may be dissolved in a suitable liquid such as an aromatic hydrocarbon and then may be combined with a supported catalyst that has been slurried in a suitable liquid. A suitable liquid may be an aromatic hydrocarbon such as toluene.

The method may comprise the step of:
contacting at least one supported catalyst and at least one fatty amine in at least one liquid vehicle, so as to form a slurry of the catalyst composition in said liquid vehicle.

The method may also comprise the steps of:
a) combining at least one supported catalyst with a liquid vehicle so as to form a slurry; and
b) combining at least one fatty amine with the slurry formed in (a) so as to form a slurry of the catalyst composition in said liquid vehicle.

The method may also comprise the steps of:
a) combining at least one fatty amine with a liquid vehicle; and
b) combining the at least one supported catalyst with the mixture formed in a) so as to form a slurry of the catalyst composition in said liquid vehicle.

In another method the supported catalyst may be substantially dried, preformed, substantially dry and/or free flowing. The preformed supported catalyst may be contacted with at least one fatty amine. The fatty amine may be in solution or slurry or in a dry state. When the fatty amine is in a dry state the fatty amine may be contacted with a supported catalyst in a rotary mixer under a nitrogen atmosphere, most preferably the mixer is a tumble mixer, or in a fluidized bed mixing process, in which the supported catalyst and the fatty amine are in a solid state, that is they are both substantially in a dry state or in a dried state.

Non-limiting examples of mixing equipment for combining a solid supported catalyst and a fatty amine, include a ribbon blender, a static mixer, a double cone blender, a drum tumbler, a drum roller, a dehydrator, a fluidized bed, a helical mixer and a conical screw mixer.

The fatty amine may be contacted with the supported catalyst for a period of time such that a substantial portion of the supported catalyst is intimately mixed and/or substantially contacted with the fatty amine.

The contact time for the fatty amine and the supported catalyst may vary depending on one or more of the conditions, temperature and pressure, the type of mixing apparatus, the quantities of the components to be combined, and even the mechanism for introducing the polymerization catalyst/fatty amine combination into the reactor.

The supported catalyst may be contacted with the fatty amine for a period of time from about a second to about 24 hours, or from about 1 minute to about 12 hours, or from about 1 minute to about 5 hours, or from about 2 minutes to about 2 hours.

The at least one supported catalyst and at least one fatty amine may be spray dried or spray congealed. The resulting spray dried powder may be subsequently slurried in a suitable liquid vehicle. The skilled person would be familiar with the various spray drying techniques known in the art.

The fatty amine may be heated in order to provide a free flowing liquid prior to contacting with the one or more supported catalysts. The temperature required to melt the fatty amine will depend on its melting point. The temperature may be greater than 20° C., or 30° C., or 40° C., or 50° C., or 60° C., or 70° C., or 80° C., or 90° C., or 100° C., or 110° C., or 120° C., or 130° C.

The fatty amine may be dried, that is, subjected to a process to reduce the level of moisture, prior to contacting with the one or more supported catalysts. The drying temperature may be greater than 20° C., or 30° C., or 40° C., or 50° C., or 60° C., or 70° C., or 80° C., or 90° C., or 100° C., or 110° C., or 120° C., or 130° C.

Contacting the one or more supported catalysts with the fatty amine may be performed at elevated temperature. The contact temperature may be greater than 20° C., or 30° C., or 40° C., or 50° C., or 60° C., or 70° C., or 80° C., or 90° C., or 100° C., or 110° C., or 120° C., or 130° C.

The contacting of the supported catalyst and the fatty amine may be performed under an inert gaseous atmosphere, such as nitrogen. The combination of the polymerization catalyst and fatty amine may also be performed in the presence of olefin(s), solvents, hydrogen and the like.

The catalyst composition may be dried to remove residual solvent. The catalyst composition may be dried at elevated temperatures for example greater than 20° C., or 30° C., or 40° C., or 50° C., or 60° C., or 70° C., or 80° C., or 90° C., or 100° C., or 110° C., or 120° C., or 130° C. The drying temperature may be less than 90° C., or 80° C., or 70° C., or 60° C., or 50° C., or 40° C.

Drying of the catalyst composition may also be performed under vacuum conditions. Alternatively or additionally drying may be facilitated by nitrogen purging or sparging through the solid or slurry.

One skilled in the art recognizes that depending on the catalyst system and the fatty amine used certain conditions of temperature and pressure would be required to prevent, for example, a loss in the activity of the catalyst system.

Additional Continuity Additives/Aids

It may also be desirable to use one or more additional continuity additives to, for example, aid in regulating static levels in polymerization reactors. The continuity additive may be used as a part of the catalyst composition or introduced directly into the reactor independently of the catalyst composition. The continuity additive may be supported on the inorganic oxide of the supported catalyst composition described herein.

Non-limiting examples of continuity additives include, amide-hydrocarbon or ethoxylated-amide compounds such as described as "surface modifiers" in WO 96/11961; carboxylate compounds such as aryl-carboxylates and long chain hydrocarbon carboxylates, and fatty acid-metal complexes; alcohols, ethers, sulfate compounds, metal oxides and other compounds known in the art. Some specific examples of continuity additives include 1,2-diether organic compounds, magnesium oxide, ARMOSTAT 310, ATMER 163, ATMER AS-990, and other glycerol esters, ethoxylated amines (e.g., N,N-bis(2-hydroxyethyl)octadecylamine), alkyl sulfonates, and alkoxylated fatty acid esters; STADIS 450 and 425, KEROSTAT CE 4009 and KEROSTAT CE 5009. chromium N-oleylanthranilate salts, calcium salts of a Medialan acid and di-tert-butylphenol; POLYFLO 130, TOLAD 511 (a-olefin-acrylonitrile copolymer and polymeric polyamine), EDENOL D32, aluminum stearate, sorbitan-monooleate, glycerol monostearate, methyl toluate, dimethyl maleate, dimethyl furnarate, triethylamine, 3,3-diphenyl-3-(imidazol-1-yl)-propin, and like compounds.

Any of the aforementioned additional continuity additives may be employed either alone or in combination as an additional continuity additive.

Other additional continuity additives useful in embodiments disclosed herein are well known to those in the art. Regardless of which additional continuity additives are used, care should be exercised in selecting an appropriate additional continuity additive to avoid introduction of poisons into the reactor. In addition, in selected embodiments, the smallest amount of the additional continuity additives necessary to bring the static charge into alignment with the desired range should be used.

The additional continuity additives may be added to the reactor as a combination of two or more of the above listed additional continuity additives. The additional continuity additive(s) may be added to the reactor in the form of a solution or a slurry, such as a slurry with a mineral oil, and may be added to the reactor as an individual feed stream or may be combined with other feeds prior to addition to the reactor. For example, the additional continuity additive may be combined with the catalyst or catalyst slurry prior to feeding the combined catalyst-static control agent mixture to the reactor.

The additional continuity additives may be added to the reactor in an amount ranging from about 0.05 to about 200 ppmw, or from about 2 to about 100 ppmw, or from about 2 to about 50 ppmw, based on the polymer production rate. The additional continuity additives may also be added to the reactor in an amount of about 2 ppmw or greater, based on the polymer production rate.

Methods of Using the Catalyst Compositions

One skilled in the art recognizes that depending on the olefin polymerization composition used, certain conditions of temperature and pressure would be required to prevent, for example, a loss in the activity of the catalyst system.

The catalyst composition as hereinbefore disclosed may be introduced directly into the polymerization reactor. The catalyst may be in the form of a slurry in a suitable liquid vehicle or may be in the form of a dry powder.

It will be appreciated that the exact method of introduction may vary depending on one or more of the conditions, temperature and pressure, the type of mixing apparatus, and the quantities of the components to be combined.

Polymerization Processes

Polymerization processes may include solution, gas phase, slurry phase and a high pressure process or a combination thereof. In illustrative embodiments, a gas phase or slurry phase polymerization of one or more olefins at least one of which is ethylene or propylene is provided. Optionally, the reactor is a gas phase fluidized bed polymerization reactor.

The catalyst compositions as hereinbefore described are suitable for use in any prepolymerization and/or polymerization process over a wide range of temperatures and pressures. The temperatures may be in the range of from −60° C. to about 280° C., from 50° C. to about 200° C.; from 60° C. to 120° C. from 70° C. to 100° C. or from 80° C. to 95° C.

The present process may be directed toward a solution, high pressure, slurry or gas phase polymerization process of one or more olefin monomers having from 2 to 30 carbon atoms, preferably 2 to 12 carbon atoms, and more preferably 2 to 8 carbon atoms. The process is particularly well suited to the polymerization of two or more olefins or comonomers such as ethylene, propylene, 1-butene, 1-pentene, 4-methyl-1-pentene, 1-hexene, 1-octene 1-decene or the like.

Other olefins useful in the present process include ethylenically unsaturated monomers, diolefins having 4 to 18 carbon atoms, conjugated or nonconjugated dienes, polyenes, vinyl monomers and cyclic olefins. Useful monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In an illustrative embodiment of the present process, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In another embodiment of the present process, ethylene or propylene is polymerized with at least two different comonomers, optionally one of which may be a diene, to form a terpolymer.

The present process may be directed to a polymerization process, particularly a gas phase or slurry phase process, for polymerizing propylene alone or with one or more other monomers including ethylene, and/or other olefins having from 4 to 12 carbon atoms. The polymerization process may comprise contacting ethylene and optionally an alpha-olefin with one or more of the catalyst compositions as hereinbefore described in a reactor under polymerization conditions to produce the ethylene polymer or copolymer.

Suitable gas phase polymerization processes are described in, for example, U.S. Pat. Nos. 4,543,399, 4,588,790, 5,028,670, 5,317,036, 5,352,749, 5,405,922, 5,436,304, 5,453,471, 5,462,999, 5,616,661, 5,668,228, 5,627,242, 5,665,818, and 5,677,375, and European publications EP-A-0 794 200, EP-A-0 802 202, EP-A2 0 891 990, and EP-B-634 421.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization process is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484. Examples of solution processes are described in U.S. Pat. Nos. 4,271,060, 5,001,205, 5,236,998 and 5,589,555.

EXAMPLES

It is to be understood that while the present disclosure has been described in conjunction with the specific embodiments thereof, the foregoing description is intended to illustrate and not limit the scope of the disclosure. Other aspects, advantages and modifications will be apparent to those skilled in the art to which the disclosure pertains. Therefore, the following examples are put forth so as to provide those skilled in the art with a complete disclosure and description of how to make and use the disclosed compositions, and are not intended to limit the scope of the disclosure.

Catalyst Compositions

Catalyst C-1 (Comparative): In a nitrogen glovebox, 8 ml toluene and 6.18 g of 30 wt % MAO solution in toluene (Albemarle Corporation, Baton Rouge, La.) were combined followed by 0.136 g of bis(1,3-methyl-n-butyl cyclopentadienyl) zirconium dichloride and the mixture was stirred for 15 minutes at ambient temperature. Five grams of Davison 948 silica previously dehydrated at 600° C. were then added and the slurry was stirred for 30 min. at ambient temperature. AS990 (90 wt % ethoxylated stearyl amine and 10% syloid silica, made by Univation Technologies LLC, USA), 0.036 g, slurried in 2.0 ml toluene was added to the mixture and stirred for 5 minutes. The composition was then nitrogen purge-dried to a free flowing solid at 70° C.

Catalyst A (Inventive): In a nitrogen glovebox, 8 ml toluene and 6.18 g of 30 wt % MAO solution in toluene (Albemarle Corporation, Baton Rouge, La.) were combined followed by 0.136 g of bis(1,3-methyl-n-butyl cyclopentadienyl) zirconium dichloride, and the mixture was stirred for 15 minutes at ambient temperature. Five grams of Davison 948 silica previously dehydrated at 600° C. were then added and the slurry was stirred for 30 min. at ambient temperature. Varonic 5202 (Ethoxylated stearyl amine, made by Evonik Goldschmidt Corporation), 0.032 g, pre-dissolved in 2.0 ml of toluene was added to the mixture and stirred for 5 minutes. The composition was then nitrogen purge-dried to a free flowing solid at 70° C.

Catalyst C-2 (comparative): In a nitrogen glovebox, 8 ml toluene and 6.18 g of 30 wt % MAO solution in toluene were combined, followed by 0.123 g of dimethylsilyl bis(tetrahydroindenyl) zirconium dichloride, and the mixture was stirred for 15 minutes at ambient temperature. Five grams of PQ ES70 silica previously dehydrated at 600° C. were then added and the slurry was stirred for 30 min. at ambient temperature. AS990 (0.144 g) slurried in 2.0 ml toluene was added to the mixture and stirred for 5 minutes. The composition was then nitrogen purge-dried to a free flowing solid at 70° C.

Catalyst B (inventive): In a nitrogen glovebox, 8 ml toluene and 6.18 g of 30 wt % MAO solution in toluene were combined, followed by 0.123 g of dimethylsilyl bis(tetrahydroindenyl) zirconium dichloride, and the mixture was stirred for 15 minutes at ambient temperature. Five grams of PQ ES70 silica previously dehydrated at 600° C. were added and the slurry was stirred for 30 min. at ambient temperature. Varonic 5202 (0.130 g) pre-dissolved in 2.0 ml toluene was added to the mixture and stirred for 5 minutes. The composition was then nitrogen purge-dried to a free flowing solid at 70° C.

Catalyst compositions D and C-3 were prepared in the same way as compositions A and C-1 respectively except that bis(n-propyl-cyclopentadienyl) zirconium dichloride was used in place of bis(1,3-methyl-n-butyl cyclopentadienyl) zirconium dichloride.

Laboratory Polymerizations

A 2 liter autoclave reactor under nitrogen purge was charged with 0.20 mmole of triisobutyl aluminum TIBAL in hexane, followed by 1-hexene comonomer (20 ml for Catalyst B and Catalyst C-2, or 60 ml for Catalyst A, D, C-1 and C-3) and 800 ml isobutane diluent. The contents of the reactor were heated to 80° C., after which, 100 mg of catalyst composition and 3 mg aluminum di-stearate were introduced concurrently with ethylene into the reactor to make up a total reactor pressure of 325 psig. The reactor temperature was maintained at 85° C., and the polymerization was allowed to proceed for 40 minutes. After 40 minutes the reactor was cooled, ethylene and isobutane vented off and the polymer dried and weighed to obtain the yield. The results are summarized in Table 1.

TABLE 1

| Laboratory Polymerizations | | | |
|---|---|---|---|
| Catalyst Composition | Support | Fatty amine | Productivity gPE/gCat/hr |
| C1 | D948-600C | AS-990 | 5,250 |
| C1 | D948-600C | AS-990 | 4,869 |
| A | D948-600C | Varonic S202 | 4,575 |
| A | D948-600C | Varonic S202 | 4,713 |
| C2 | ES70-600C | AS-990 | 4,071 |
| B | ES70-600C | Varonic S202 | 3,884 |
| C3 | D948-600C | AS-990 | 10,330 |
| D | D948-600C | Varonic S202 | 10,485 |

The results illustrate that catalyst productivity was not influenced by the source of fatty amine.

Continuous Pilot Plant Polymerizations

Supported catalysts of similar compositions to A, B, C-1 and C-2 were tested in a continuous pilot-scale gas phase fluidized bed reactor having a 0.6 meters internal diameter and 4.4 meters in bed height. The fluidized bed was made up of polymer granules and the gaseous feed streams of ethylene and hydrogen together with liquid 1-hexene comonomer were introduced below the reactor bed into the recycle gas line. The individual flow rates of ethylene, hydrogen and 1-hexene were controlled to maintain fixed composition targets. The ethylene concentration was controlled to maintain a constant ethylene partial pressure. The hydrogen was controlled to maintain constant hydrogen to ethylene mole ratio. The concentrations of all the gases were measured by an on-line gas chromatograph to ensure relatively constant composition in the recycle gas stream. The reacting bed of growing polymer particles was maintained in a fluidized state by the continuous flow of the make-up feed and recycle gas through the reaction zone. A superficial gas velocity of about 0.7 meters/sec was used to achieve this. The reactor was operated at a total pressure of 2200 kPa. The fluidized bed was maintained at a constant height by withdrawing a portion of the bed at a rate equal to the rate of formation of particulate product. The polymer production rate was in the range of 60-70 kg/hour. The product was removed semi-continuously via a series of valves into a fixed volume chamber. This product was purged to remove entrained hydrocarbons and treated with a small stream of humidified nitrogen to deactivate any trace quantities of residual catalyst.

Table 2 below indicates that inventive catalyst compositions A and B gave improved productivity relative to comparative catalyst compositions C1 and C2 based on material balance methods. Furthermore the reactor skin temperatures and static measurements indicated that the inventive catalyst compositions performed well without process upsets.

TABLE 2

Pilot Plant Polymerizations

| Catalyst Composition Type | Fatty amine | Cat. Activity matl. balance (kg/kg) | Partial Pressure C2 (psia) | H2/C2 analyzer ratio (ppm/mole %) | C6/C2 analyzer ratio | Bed Temperature °C. |
|---|---|---|---|---|---|---|
| A | Varonic S202 | 8407 | 220 | 1.99 | nd | 80.7 |
| C1 | AS-990 | 7489 | 220 | 2.00 | 0.0206 | 80.7 |
| B | Varonic S202 | 7488 | 201 | 12.8 | 0.0002 | 79 |
| C2 | AS-990 | 6886 | 201 | 12.8 | 0.0002 | 79 |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present disclosure.

What is claimed is:

1. A catalyst composition, comprising at least one supported polymerization catalyst wherein the catalyst composition is modified with at least one fatty amine wherein the at least one fatty amine is substantially free of particulate inorganic material, wherein the at least one supported polymerization catalyst comprises two or more catalyst compounds comprising one or more metallocene compounds and one or more Group 15 containing metal compounds, wherein the one or more metallocene compounds is selected from:
(pentamethylcyclopentadienyl)(propylcyclopentadienyl)MX$_2$,
(tetramethylcyclopentadienyl)(propylcyclopentadienyl)MX$_2$,
(tetramethylcyclopentadienyl)(butylcyclopentadienyl)MX$_2$,
Me$_2$Si(indenyl)$_2$MX$_2$,
Me$_2$Si(tetrahydroindenyl)$_2$MX$_2$,
(n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
(propyl cyclopentadienyl)(tetramethylcyclopentadienyl)MX$_2$,
(butyl cyclopentadienyl)$_2$MX$_2$ or
(propyl cyclopentadienyl)$_2$MX$_2$,
and the one or more Group 15 containing metal compounds is selected from:
HN(CH$_2$CH$_2$N(2,4,6-Me$_3$phenyl))$_2$MX$_2$ or
HN(CH$_2$CH$_2$N(2,3,4,5,6-Me$_5$phenyl))$_2$MX$_2$,
wherein M is Zr or Hf, and X is selected from the group consisting of F, Cl, Br, I, Me, benzyl, CH$_2$SiMe$_3$, and C1 to C5 alkyls or alkenyls.

2. The catalyst composition of claim 1 wherein the at least one fatty amine contains less than 1% by weight of particulate inorganic material.

3. The catalyst composition of claim 1 wherein the particulate inorganic material comprises a particulate silica.

4. The catalyst composition of claim 1 wherein the at least one fatty amine is represented by the formula:

$(R_1)_xN(R_2OH)_y$ wherein
R$_1$ is a hydrocarbyl radical having from 8 to 40 carbon atoms;
R$_2$ is a hydrocarbylene diradical having from 1 to 8 carbon atoms; and
x has a value of 1 or 2 and x+y=3.

5. The catalyst composition of claim 4 wherein R$_1$ is a hydrocarbyl radical having from 14 to 26 carbon atoms and R$_2$ is methylene, ethylene, n-propylene, n-butylene or iso-propylene.

6. The catalyst composition of claim 1 wherein the at least one fatty amine is ethoxylated stearyl amine.

7. The catalyst composition of claim 1 wherein the at least one fatty amine is present from about 0.1% to about 20% by weight of the catalyst composition.

8. The catalyst composition of claim 1 wherein the supported polymerization catalyst comprises a support, an activator, and one or more catalyst compounds comprising a titanium, a zirconium, or a hafnium atom.

9. The catalyst composition of claim 1 comprising at least one further continuity additive.

10. The catalyst composition according to claim 9 wherein the at least one further continuity additive comprises at least one metal carboxylate salt.

11. A process for polymerizing olefins, the process comprising:
contacting olefins with one or more catalyst compositions of claim 1 in a reactor under polymerization conditions to produce an olefin polymer or copolymer.

12. A method for producing a catalyst composition, comprising the step of contacting at least one supported catalyst with at least one fatty amine wherein the fatty amine is substantially free of particulate inorganic material, wherein the at least one supported catalyst comprises two or more catalyst compounds comprising one or more metallocene compounds and one or more Group 15 containing metal compounds, wherein the one or more metallocene compounds is selected from:
(pentamethylcyclopentadienyl)(propylcyclopentadienyl)MX$_2$,
(tetramethylcyclopentadienyl)(propylcyclopentadienyl)MX$_2$,
(tetramethylcyclopentadienyl)(butylcyclopentadienyl)MX$_2$,
Me$_2$Si(indenyl)$_2$MX$_2$, Me$_2$Si(tetrahydroindenyl)$_2$MX$_2$,
(n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
(propyl cyclopentadienyl)(tetramethylcyclopentadienyl)MX$_2$,
(butyl cyclopentadienyl)$_2$MX$_2$ or
(propyl cyclopentadienyl)$_2$MX$_2$,
and the one or more Group 15 containing metal compounds is selected from:
HN(CH$_2$CH$_2$N(2,4,6-Me$_3$phenyl))$_2$MX$_2$ or
HN(CH$_2$CH$_2$N(2,3,4,5,6-Me$_5$phenyl))$_2$MX$_2$,
wherein M is Zr or Hf, and X is selected from the group consisting of F, Cl, Br, I, Me, benzyl, CH$_2$SiMe$_3$, and C1 to C5 alkyls or alkenyls.

13. The method of claim 12 comprising the step of:
contacting at least one supported catalyst and at least one fatty amine in at least one liquid vehicle, so as to form a slurry of the catalyst composition in said liquid vehicle.

14. The method of claim 13, comprising the steps of:
a) combining at least one supported catalyst with a liquid vehicle to form a slurry; and
b) adding at least one fatty amine to the slurry so as to form a slurry of the catalyst composition in said liquid vehicle.

15. The method of claim 13, comprising the steps of:
a) combining at least one fatty amine with a liquid vehicle; and
b) combining at least one supported catalyst with the mixture formed in a) so as to form a slurry of the catalyst composition in said liquid vehicle.

16. The method of claim 13 wherein the liquid vehicle is an aromatic hydrocarbon.

17. The method of claim 13, wherein the process further comprises the step of drying the slurry to provide a substantially free flowing powder.

18. The method of claim 12 wherein the at least one fatty amine is represented by the formula:

$$(R_1)_xN(R_2OH)_y$$

wherein
R$_1$ is a hydrocarbyl radical having from 9 to 40 carbon atoms;
R$_2$ is a hydrocarbylene diradical having from 1 to 8 carbon atoms; and
x has a value of 1 or 2 and x+y=3.

* * * * *